United States Patent Office 3,491,289
Patented Jan. 20, 1970

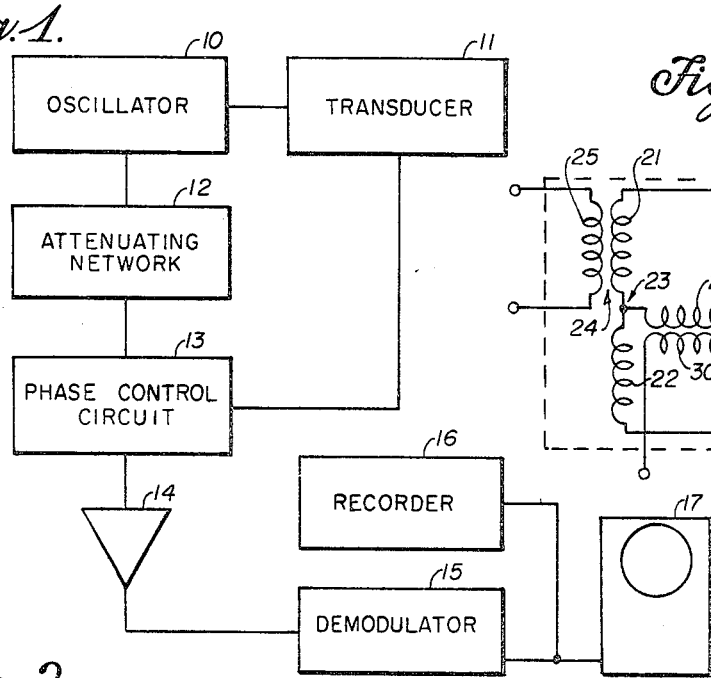
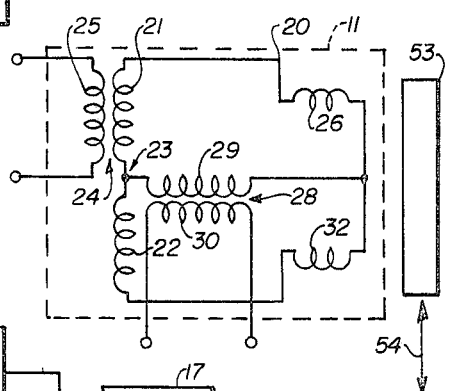
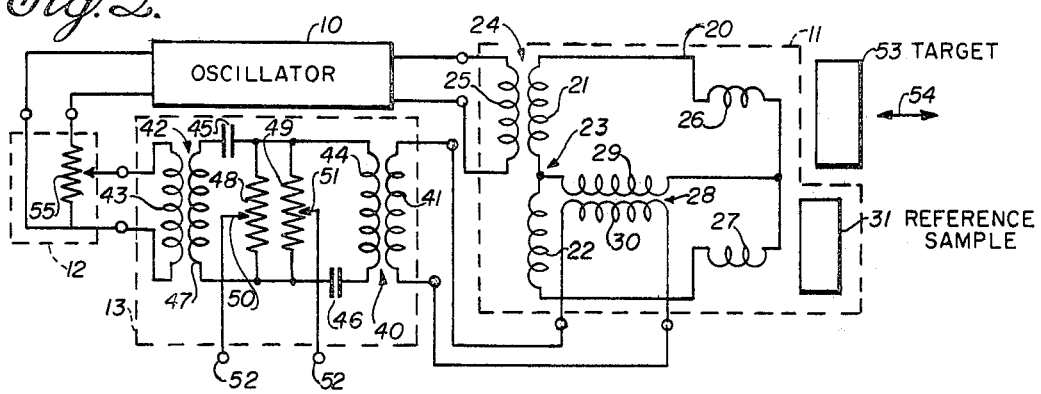
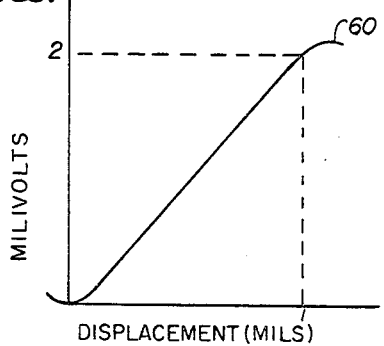

3,491,289
NON-CONTACT EDDY CURRENT INSTRUMENT
Richard R. Petrini, Livermore, Calif., assignor to the United States of America as represented by the United States Atomic Energy Commission
Filed Dec. 17, 1968, Ser. No. 784,342
Int. Cl. G01r 33/14, 27/00
U.S. Cl. 324—40         5 Claims

ABSTRACT OF THE DISCLOSURE

A non-contact eddy current instrument for determining variations in the displacement of an electrically conductive target having a transducer responsive to the displacements thereof. When the transducer is energized with an excitation signal having a constant amplitude and a fixed frequency, displacement of the target causes the transducer to transmit an input signal to a phase control circuit, the input signal being amplitude, phase-shifted. Variations in the target displacement produce amplitude changes in the input signal that are calibratable measures of the variations. The phase control circuit inversely phase and amplitude matches the input signal with a reference input signal producing an output signal from the phase control circuit having an amplitude corresponding to the amplitude changes of the input signal. The output signal is a highly accurate, calibratable measure of the variations of the target displacement.

BACKGROUND OF THE INVENTION

The invention described herein was made in the course of, or under, Contract W-7405-ENG-48 with the United States Atomic Energy Commission.

This invention relates to a non-contact eddy current instrument and particularly to a novel transducer and a novel phase control circuit capable of use therein.

Non-contact eddy current instruments have many applications including measuring displacements of and changes in thickness of an electrically conductive target. When a non-contact eddy current instrument is used to measure displacements of a target, it is common practice to secure a test probe containing an active coil near, but not in contact with, the target. The active coil is energized with an excitation signal having a constant amplitude and a fixed frequency to establish a magnetic field which induces eddy curents in the target. The eddy currents generate an additional magnetic field that induces a charge in the inductive reactance of the active coil. When the target is displaced, the magnetic field generated by the eddy currents varies producing a corresponding change in the inductive reactance of the active coil. An impedance bridge, responsive to changes in the inductive reactance of the active coil, transmits a signal having a phase shift when compared to the excitation signal. The amplitude of the signal is a calibratable measure of the displacement of the target.

When the active coil is energized and no displacement of the target has occurred, it is very common for the impedance bridge to be in an unbalanced state. As a result, the bridge transmits a signal having an initial phase shift when compared to the excitation signal. The amplitude of the initially phase shifted signal is typically at least one order of magnitude greater than the amplitude change of the signal produced by very small displacements of the target.

One problem common to non-contact eddy current instruments is to eliminate the initially phase shifted signal in a manner that affords a linear measure of very small target displacements that will permit precise calibration of the instrument. The amplitude of the signal transmitted by the impedance bridge is a linear measure of target displacements over a limited range of displacements determined by the design of the impedance bridge and the zero displacement position of the target. Under any conditions, the linear range occurs when the bridge is in an unbalanced state. Therefore, the initially phase shifted signal must be cancelled, simulating a balanced impedance bridge, rather than being reduced to a null signal by actually balancing the bridge. Although several prior art non-contact eddy current instruments utilize the principle of simulating a balanced impedance bridge, the circuitry used has inherent drift and is also not capable of eliminating electrical noise carried by the excitation signal. These characteristics seriously impair the accuracy of non-contact eddy current instruments when used to measure very small target displacements.

A second problem common to non-contact eddy current instruments is to cancel the initially phase shifted signal before the signal is amplifield to permit detection by a read-out device. Many applications of an instrument require that the test probe be positioned such that the spacing between the target and the active coil cannot be readjusted after the initial placement. It is not uncommon in such an application for the local environment of the test probe to vary prior to the measurement of the target displacement thereby causing the amplitude of the signal to significantly increase. Such increases may be sufficient to drive the amplifier above its linear operating range thereby seriously impairing the accuracy of the instrument.

SUMMARY OF THE INVENTION

The non-contact eddy current instrument of the present invention overcomes the deficiencies of the prior art apparatus for measuring minute displacements of an electrically conductive target. The inventive instrument is comprised of an oscillator transmitting an excitation signal having a constant amplitude and a fixed frequency to a transducer. The transducer is responsive to displacements of a target positioned near, but not in contact with, the transducer and transmits to a phase control circuit an input signal that is a measure of the displacements. A reference signal from the oscillator, identical to the excitation signal, is transmitted to an attenuating network. A reference input signal from the attenuating network provides a second input to the phase control circuit. An output signal from the phase control circuit is an amplitude changing signal that is a highly accurate, calibratable measure of displacements of the target.

The transducer of the inventive non-contact eddy current instrument is comprised of an impedance bridge and is a self-contained unit adapted to function as a test probe. The entire impedance bridge experiences the same environments, particularly temperature, thereby eliminating the need for environmental compensating circuitry. Also, the transducer is capable of operating in radiation fields since it provides extremely fast recovery from the initial neutron shock. The minimum size of the tarnsducer is typically very small thereby permitting numerous applications of the inventive non-contact eddy current instrument.

It is common for the transducer to transmit an input signal to the phase control circuit, corresponding to no displacement of the target, having an initial phase shift when compared to the excitation signal. The phase control circuit has adjustable means for precisely cancelling the initially phase shifted input signal with the reference input signal thereby simulating a balance impedance bridge under any conditions of actual bridge unbalance. The phase control circuit provides an output signal having an amplitude that is linearly proportional to very small displacements of the target, e.g., one (1) microinch. The phase control circuit also has excellent noise cancelling characteristics and the circuitry necessary to permit detection of the output signal is relatively free from drift. Therefore, the inventive non-contact eddy current instrument allows highly accurate measurement of minute displacements of the target.

BRIEF DESCRIPTION OF THE DRAWINGS

In the drawings wherein like reference characters denote like elements in the several diagrams:

FIGURE 1 is a block diagram showing an embodiment of the inventive non-contact eddy current instrument including an amplifying and readout means.

FIGURE 2 is a schematic diagram of the non-contact eddy current instrument of FIGURE 1 showing the transducer and the phase control circuit in detail.

FIGURE 2a is a schematic diagram of a second embodiment of the transducer of FIGURE 2.

FIGURE 3 is a graph of the amplitude of the output signal from the phase control circuit in millivolts for the non-contact eddy current instrument of FIGURE 1 is a function of the displacement of an electrically conductive target in mils.

DESCRIPTION OF THE INVENTION

Non-contact eddy current instruments have many applications in measuring variations in an electrically conductive target including displacements of the target. FIGURE 1 is a block diagram of an embodiment of a non-contact eddy current instrument of the present invention adapted to measure displacements of the target along a longitudinal axis of an active coil of the instrument. With reference to the figure, oscillator 10 provides an excitation signal at a constant amplitude and a fixed frequency to a transducer 11. A reference signal identical to the excitation signal is also provided to an attenuating network 12. A reference input signal from attenuating network 12 comprises one input to a phase control circuit 13. A second input signal to phase control circuit 13 is provided by transducer 11. A single output signal from phase control circuit 13 is amplified by an A.C. amplifier 14 and converted to a D.C. signal by a demodulator 15. The D.C. signal is simultaneously stored in a recorder 16 and visually displayed on an oscilloscope 17.

Referring now to FIGURE 2, transducer 11 of FIG. 1 is shown comprised of a four-leg, impedance bridge 20. Coils 21 and 22 form a center-tapped secondary winding 23 of a line impedance matching transformer 24 and are provided as two legs of the bridge 20. A primary winding 25 of transformer 24 is coupled to the excitation signal from oscillator 10. An active coil 26 and a reference coil 27 form the remaining two legs of bridge 20. A bridge transformer 28 has a primary winding 29 coupled between the center-tap of secondary winding 23 of transformer 24 and a point common to active coil 26 and reference coil 27. A secondary winding 30 of transformer 28 provides the input signal to phase control circuit 13. A reference sample 31, preferably of the same material as the target, is positioned near reference coil 27. When transducer 11 is energized and impedance bridge 20 is in an unbalanced state, the input signal to phase control circuit 13 has a phase shift when compared to the excitation signal or the reference signal.

FIGURE 2a is a second embodiment of transducer 11 capable of being used in the non-contact eddy current instrument of FIGURE 1. The transducer 11 permits measurements of displacements of a target along an axis perpendicular to a longitudinal axis of an active coil of the transducer. Referring now to FIGURE 2a, reference coil 27 of transducer 11 of FIGURE 2 has been replaced with a second active coil 32 and reference sample 31 has been removed. The remainder of the circuit elements are the same as shown in FIGURE 2 and are operably connected as described above.

Referring again to FIGURE 2, phase control circuit 13 of FIGURE 1 is shown comprised of a signal transformer 40 having a primary winding 41 coupled to the input signal from transducer 11 and a reference transformer 42 having a primary winding 43 coupled to the reference input signal from attenuating network 12. A secondary winding 44 of signal transformer 40 is capacitively coupled through capacitors 45 and 46 to a secondary winding 47 of reference transformer 42. Two phase control potentiometers 48 and 49 are coupled in parallel between a point common to capacitor 45 and secondary winding 44 of signal transformer 40 and a point common to capacitor 46 and secondary winding 47 of reference transformer 42. The two potentiometers 48 and 49 have wipers 50 and 51, respectively, that form terminals 52 of the output signal from phase control circuit 13 to the A.C. amplifier 14.

In a typical operation of the non-contact eddy current instrument of FIGURE 1, transducer 11 is rigidly positioned near, but not in contact with, target 53 such that displacements of the target, as indicated by arrow 54 in FIGURE 2, occur along a longitudinal axis of active coil 26. The initial spacing between the active coil and the target is selected to produce a balanced impedance bridge 20. However, when transducer 11 is energized by the excitation signal, it is very common for the bridge to be in an unbalanced state and the transducer transmits an initial input signal to phase control circuit 13, the signal being amplitude, phase shifted. This initially phase shifted input signal must be cancelled thereby simulating a balanced impedance bridge before the non-contact eddy current instrument can be calibrated.

The phase control circuit 13, positioned at a remote distance from transducer 11, cancels the initially phase shifted input signal with the reference signal from attenuating network 12. Referring to FIGURE 2, wipers 50 and 51 of potentiometers 48 and 49 are adjusted until the phase of the reference input signal is precisely one-hundred and eighty (180) degrees out of phase with the initially phase shifted input signal from transducer 11. Attenuating network 12, conveniently shown as a potentiometer 55, is adjusted so as to match the amplitude of the reference input signal to the amplitude of the initially phase shifted input signal. When the amplitudes are precisely matched, the two signals cancel each other and no signal occurs across the output terminals 52 of phase control circuit 13.

Displacement of target 53 from its original position induces a change in the inductive reactance of active coil 26. This change alters the initial current distribution in the unbalanced impedance bridge 20 thereby causing a change in the voltage across primary winding 29 of bridge transformer 28. The voltage change produces an amplitude change and a slight phase shift in the input signal to phase control circuit 13. The reference input signal from attenuating network 12 no longer cancels the input signal from transducer 11 and a signal occurs across output terminals 52 of phase control circuit 13. The amplitude of the output signal from phase control circuit 13 is a highly accurate, calibratable measure of the displacement of target 53.

The amplitude of the input signal to phase control circuit 13 varies in a periodic manner as the displacement of target 53 increases and the rate of change of the amplitude is constant over a range of displacements determined by the design of transducer 11 and the initial spacing between the transducer and target 53. By positioning the target at a distance from the transducer that results in an unbalanced impedance bridge 20 wherein any further unbalance will produce a linear amplitude change in the input signal to phase control circuit 13, the linear range of transducer 11 corresponds to very small displacements of target 53. This linear range is reproduced in the output signal from phase control circuit 13. FIGURE 3 is a graph of the amplitude of the output signal 60 of phase control circuit 13 for the non-contact eddy current instrument of FIGURE 1 having the component values listed in Table I. The long term stability for this linear range is plus or minus four-tenths (0.4) of a microinch for a seventy-two (72) hour period.

TABLE I

| | |
|---|---|
| Oscillator 10 (crystal controlled) ___megacycle__ | 1 |
| Transducer 11: | |
|   Line impedance matching transformer 24: | |
|     Primary winding 25 | |
|       (8 turns) _____microhenrys__ | 8 |
|     Secondary winding 23: | |
|       Coil 21 (8 turns) _____do____ | 8 |
|       Coil 22 (8 turns) _____do____ | 8 |
|   Bridge transformer 28: | |
|     Primary winding 29 _____turns__ | 20 |
|     Secondary winding 30 _____do____ | 8 |
|   Active coil 26 _____microhenrys__ | 10.75 |
|   Reference coil 27 _____do____ | 10.75 |
| Phase control circuit 13: | |
|   Signal transformer 40: | |
|     Primary winding 41 _____turns__ | 12 |
|     Secondary winding 44 _____do____ | 48 |
|   Reference transformer 42: | |
|     Primary winding 43 _____do____ | 12 |
|     Secondary winding 47 _____do____ | 48 |
| Capacitor 45 _____microfarads__ | .001 |
| Capacitor 46 _____do____ | .001 |
| Phase control potentiometer 48 | |
|   (10 turns) _____ohms__ | 20 |
| Phase control potentiometer 49 | |
|   (10 turns) _____do____ | 20 |

It has been shown that the inventive non-contact eddy current instrument provides a means for measuring very minute displacements of an electrically conductive target, typically as small as one (1) microinch. Apart from the high degree of accuracy, the inventive instrument is particularly versatile in that the self-contained transducer is typically very small and the signal from the transducer does not require environmental compensating circuitry to adjust for varying local environments, particularly temperature. In addition, the transducer is capable of operating in radiation fields since it has extremely fast recovery from initial neutron shocks.

The phase control circuit is remotely located with respect to the transducer thereby permitting readjustments of he non-contact eddy current instrument just prior to target displacement to insure precise cancellation of the initially phase shifted input signal from the transducer. In addition, the phase control circuit cancels the input signal before the amplification stage so that the linear region of the amplifier is not wasted cancelling the signal.

While particular embodiments of the invention have been illustrated and described, modifications will become apparent to those skilled in the art, and it is intended to cover in the appended claims all such modifications as come within the true spirit and scope of the invention.

I claim:
1. A non-contact eddy current instrument comprising a phase control circuit comprised of a signal transformer having at least one primary winding and at least one secondary winding, the primary winding of the signal transformer being adapted to be coupled to an input signal, a reference transformer having at least one primary winding and at least one secondary winding, the primary winding of the reference transformer being adapted to be coupled to a reference input signal, the secondary windings having a terminal at each end, at least one capacitor coupled between one terminal of the secondary winding of the signal transformer and one terminal of the secondary winding of the reference transformer, at least one capacitor coupled between the other terminal of the secondary winding of the signal transformer and the other terminal of the secondary winding of the reference transformer, at least one pair of potentiometers coupled in parallel between a point common to the first mentioned capacitor and the secondary winding of the signal transformer and a point common to the second mentioned capacitor and the secondary winding of the reference transformer, each potentiometer of the pair of potentiometers having an adjustable wiper, the wipers being adapted to provide an output signal from the phase control circuit;

in combination with an energizing source adapted to provide two identical constant amplitude and fixed frequency excitation signals to a transducer and an attenuating means, the attenuating means being operably connected to the primary winding of the reference transformer of the phase control circuit, the transducer being comprised of an impedance bridge having four legs, each of two adjacent legs of the impedance bridge containing an active coil, a first transformer having a primary winding and a center-tapped secondary winding, the primary winding of the first transformed being operably connected to the energizing source, the secondary winding of the first transformer forming the two remaining legs of the impedance bridge, and a second transformer having a primary winding and a secondary winding, the primary winding of the second transformer being operably connected between a point common to the two active coils and the center-tap of the secondary winding of the first transformer, the secondary winding of the second transformer being operably connected to the primary winding of the signal transformer of the phase control circuit.

2. The combination as defined in claim 1 in further combination with an A.C. amplifier operably connected to the potentiometer wipers of the phase control circuit, a demodulator operably connected to the amplifier, and a read-out means operably connected to the demodulator.

3. The combination as defined in claims 1 or 2 further defined in that one of the active coils of the transducer is a reference coil, the reference coil being fixedly positioned near an electrically conductive reference material enclosed within the transducer.

4. A non-contact eddy current instrument comprising a phase control circuit comprised of a signal transformer having at least one primary winding and at least one secondary winding, the primary winding of the signal transformer being adapted to be coupled to an input signal, a reference transformer having at least one primary winding and at least one secondary winding, the primary winding of the reference transformer being adapted to be coupled to a reference input signal, the secondary windings having a terminal at each end, at least one capacitor coupled between one terminal of the secondary winding of the signal transformer and one terminal of the secondary winding of the reference transformer, at least one capacitor coupled between the other terminal of the secondary winding of the signal transformer and the other terminal of the secondary winding of the reference transformer, at least one pair of potentiometers coupled in parallel between a point common to the first mentioned capacitor and the secondary winding of the signal transformer and a point common to the second mentioned capacitor and the secondary winding of the reference transformer, each potentiometer of the pair of potentiometers having an adjustable wiper, the wipers being adapted to provide an output signal from the phase control circuit;

in combination with a transducer to provide an output signal in accordance with changes in the inductive reactance of no more than two active coils comprised of an impedance bridge having four legs, each of two adjacent legs of the impedance bridge containing an active coil, a first transformer having a primary winding and a center-tapped secondary winding, the primary winding of the first transformer being adapted to receive an excitation signal from an associated energizing source, the secondary winding of the first transformer forming the two remaining legs of the impedance bridge, and a second transformer having a primary winding and a secondary winding, the primary winding of the second transformer being operably connected between a point common to the two active coils and the center-tap of the secondary winding of the first transformer, the secondary winding of the second transformer being coupled to said signal transformer primary winding of said phase control circuit, whereby the output signal from the transducer serves as the input signal to the phase control circuit.

5. The combination as defined in claim 4 further defined in that one of the active coils of the transducer is a reference coil, the reference coil being fixedly positioned near an electrically conductive reference material enclosed within the transducer.

References Cited

UNITED STATES PATENTS

| 2,706,805 | 4/1955 | Clewell | 324—40 |
| 3,252,084 | 5/1966 | Krobath | 324—40 |
| 3,286,168 | 11/1966 | Schmidt | 324—40 |
| 3,358,225 | 12/1967 | Peugeot | 324—40 |

RUDOLPH V. ROLINEC, Primary Examiner

R. J. CORCORAN, Assistant Examiner

U.S. Cl. X.R.

323—75, 123; 324—57